United States Patent
Yasuda

(10) Patent No.: US 12,332,647 B2
(45) Date of Patent: Jun. 17, 2025

(54) MOBILE BODY CONTROL APPARATUS, MOBILE BODY CONTROL METHOD, MOBILE BODY CONTROL SYSTEM, AND NON-TRANSITORY COMPUTER-READABLE STORAGE MEDIUM STORING MOBILE BODY CONTROL PROGRAM

(71) Applicant: NEC Corporation, Tokyo (JP)

(72) Inventor: Shinya Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 198 days.

(21) Appl. No.: 18/022,827

(22) PCT Filed: Sep. 30, 2020

(86) PCT No.: PCT/JP2020/037196
§ 371 (c)(1),
(2) Date: Feb. 23, 2023

(87) PCT Pub. No.: WO2022/070324
PCT Pub. Date: Apr. 7, 2022

(65) Prior Publication Data
US 2023/0305561 A1    Sep. 28, 2023

(51) Int. Cl.
*G05D 1/00*    (2024.01)
(52) U.S. Cl.
CPC .................. *G05D 1/0212* (2013.01)
(58) Field of Classification Search
CPC . G05D 1/0212; G05D 1/0217; G01C 21/3453
See application file for complete search history.

(56) References Cited

U.S. PATENT DOCUMENTS

2015/0284010 A1* 10/2015 Beardsley ............ G08G 5/0013
                                                                  701/1
2022/0366307 A1* 11/2022 To ........................... G08G 9/00

FOREIGN PATENT DOCUMENTS

| JP | H08-016240 A | 1/1996 |
| JP | H08-018240 A | 1/1996 |
| WO | 2012/086029 A1 | 6/2012 |
| WO | 2013/002067 A1 | 1/2013 |

OTHER PUBLICATIONS

JP Office Action for Japanese Patent Application No. 2022-553318, mailed on Apr. 2, 2024 with English Translation.
International Search Report for PCT Application No. PCT/JP2020/037196, mailed on Dec. 1, 2020.

(Continued)

*Primary Examiner* — Rami Khatib

(57) ABSTRACT

A conventional mobile body control apparatus includes: a robot control unit configured to control a mobile body based on a first control input value; and a control input calculation unit configured to calculate a second control input value that will be the first control input value of the next control cycle, in which the control input calculation unit calculates a route cost through simulation of at least one predictive control input value predicted to be provided to the robot control unit after the first control input value, the simulation being performed by taking into account a stochastic noise, to thereby calculate the second control input value that results in a smaller route cost.

9 Claims, 13 Drawing Sheets

(56) References Cited

OTHER PUBLICATIONS

N. Shintaro and D. Hisashi, "A study of prediction and branch of behavior in an inverted pendulum swing-up stabilization using Monte Calro Model Predictive control method", Papers from Automatic Control Federation Conference, vol. 61, pp. 423-427 (2018).
J. R. Medina and S. Hirche, "Considering Uncertainty in Optimal Robot Control Through High-Order Cost Statistics," IEEE Transactions on Robotics, vol. 34, No. 4, pp. 1068-1081 (2018).
JP Office Communication for JP Application No. 2022-553318, mailed on Nov. 5, 2024 with English Translation.

* cited by examiner

MOBILE BODY CONTROL APPARATUS, MOBILE BODY CONTROL METHOD, MOBILE BODY CONTROL SYSTEM, AND NON-TRANSITORY COMPUTER-READABLE STORAGE MEDIUM STORING MOBILE BODY CONTROL PROGRAM

This application is a National Stage Entry of PCT/JP2020/037196 filed on Sep. 30, 2020, the contents of all of which are incorporated herein by reference, in their entirety.

TECHNICAL FIELD

The present disclosure relates to a mobile body control apparatus, a mobile body control method, a mobile body control system, and a non-transitory computer-readable storage medium storing a mobile body control program, and in particular, to a mobile body control apparatus, a mobile body control method, a mobile body control system, and a non-transitory computer-readable storage medium storing a mobile body control program that are adapted to perform periodic update of a control input value for indicating the traveling state of a mobile body.

BACKGROUND ART

Mobile bodies such as robots and the like to be operated at locations where the state of obstacles change from moment-to-moment have been proposed in recent years. A problem with these mobile bodies is that an optimal control input cannot be determined in advance. In view of the aforementioned problem, Non-Patent Literatures 1 and 2 disclose a control technique that can be applied in accordance with the conditions of the location where the mobile body is to be operated.

In Non-Patent Literature 1, a simulation is performed a number of times for each periodically repeated control cycle, and the control input sequence is varied in each simulation to find out what inputs ultimately result in a cost reduction. In Non-Patent Literature 1, the weighted average value of the control input values that make up the control input sequence that minimizes the final cost is the control input value of the next control cycle.

Non-Patent Literature 2 discloses a technique of analytically determining what control input should be applied to minimize an evaluation function using a (risk-sensitive) evaluation function that makes the function behave in a risk-sensitive manner by mathematically processing the cost function.

CITATION LIST

Non-Patent Literature

Non-Patent Literature 1: Shintarou Nakatani, Hisashi Date, "A study of prediction and branch of behavior in an inverted pendulum swing-up stabilization using Monte Calro Model Predictive control method", Papers from Automatic Control Federation Conference, Vol. 61, pp. 423-427 (2018)

Non-Patent Literature 2: J. R. Medina and S. Hirche, "Considering Uncertainty in Optimal Robot Control Through High-Order Cost Statistics," IEEE Transactions on Robotics, Vol. 34, No. 4, pp. 1068-1081 (2018).

SUMMARY OF INVENTION

Technical Problem

However, in the technique described in Non-Patent Literature 1, there is a problem in that when there is a difference between the actual indicated value and a logical indicated value (for example, in the case where there is a difference between the actual speed of the mobile body and the speed indicated by the control input value), the accuracy of control cannot be guaranteed. Further, in the technique disclosed in Non-Patent Literature 2, there is a problem in that the formulae are too complex to solve and thus cannot be applied to practical cases such as transport robots.

Solution to Problem

According to an aspect of the present disclosure, a mobile body control apparatus includes:
a robot control unit configured to control a mobile body based on a first control input value; and
a control input calculation unit configured to calculate a second control input value that will be the first control input value of the next control cycle, in which
the control input calculation unit calculates a route cost through simulation of at least one predictive control input value predicted to be provided to the robot control unit after the first control input value, the simulation being performed by taking into account a stochastic noise, to thereby calculate the second control input value that results in a smaller route cost.

According to an aspect of the present disclosure, a mobile body control method includes: a robot control step of controlling a mobile body based on a first control input value; and a control input calculation step of calculating a second control input value that will be the first control input value of the next control cycle, in which in the control calculation step, a route cost is calculated through simulation of at least one predictive control input value predicted to be provided to the robot control step after the first control input value, the simulation being performed by taking into account a stochastic noise, to thereby calculate the second control input value that results in a smaller route cost.

According to an aspect of the present disclosure, a mobile body control system includes: a robot control unit configured to control a mobile body based on a first control input value; and a control input calculation unit configured to calculate a second control input value that will be the first control input value of the next control cycle, in which the control input calculation unit calculates a route cost through simulation of at least one predictive control input value predicted to be provided to the robot control unit after the first control input value, the simulation being performed by taking into account a stochastic noise, to thereby calculate the second control input value that results in a smaller route cost.

According to an aspect of the present disclosure, a non-transitory computer readable medium storing a mobile body control program the program configured to execute: control input calculation processing for calculating a route cost through simulation of at least one predictive control input value, which is a predictive value of a first control input value predicted to be used after the first control input value which is provided to a mobile body in a current control cycle, the simulation being performed by taking into account a stochastic noise, thereby calculating a second control input value that results in a smaller route cost; and robot control processing for controlling a mobile body based on the first control input value set in accordance with the second control value, each processing being performed through a computation operation performed by a computation unit.

Advantageous Effects of Invention

According to a mobile body control apparatus, a mobile body control method, a mobile body control system, and a non-transitory computer-readable storage medium storing a mobile body control program, it is possible to enhance the accuracy of control regardless of the difference between the actual indicated value and a logical indicated value.

EXAMPLE EMBODIMENT

Figure 1:
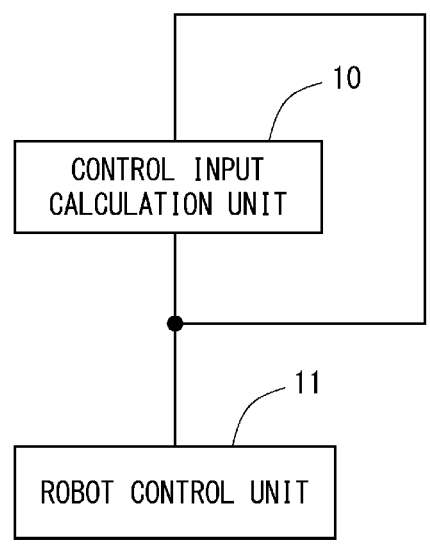
FIG. 1 is a schematic diagram of a control input apparatus according to a first example embodiment.

For the sake of clarification, the following description and the attached drawings are shortened and simplified where appropriate. Further, each of the structural elements shown in the drawings as a functional block that performs various processing can be configured of a CPU (Central Processing Unit), a memory, and other circuits in terms of hardware, and can be realized by a program or the like loaded in the memory in terms of software. Therefore, it is understood by a person skilled in the art that these functional blocks can be implemented by various forms such a hardware configuration, a software configuration, or a combination thereof, and it is not to be limited to any one of them. Note in the drawings, the identical reference symbols denote identical structural elements and the redundant explanation thereof is omitted as appropriate.

Further, the aforementioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

First Example Embodiment

The mobile body control apparatus described below controls the speed, the traveling direction, and the like of a mobile body such as a robot, but in the following description, the parameter to be controlled is speed. Note that the mobile body control apparatus can perform control other than speed such as the traveling direction of a robot or movement of the robot's arm by changing the parameter to be controlled.

FIG. 1 is a block diagram showing a mobile body control apparatus 1 according to a first example embodiment. As shown in FIG. 1, the mobile body control apparatus 1 according to the first example embodiment includes a control input calculation unit 10 and a robot control unit 11. Note that the mobile body control apparatus 1 performs processing described below for each control cycle repeated at a predetermined cycle but the present disclosure is not limited to the configuration in which the control cycle is repeated at a predetermined cycle.

The robot control unit 11 controls a mobile body based on a first control input value. To be more specific, the robot control unit 11 controls a mobile body by providing, to the mobile body, a direction indication value indicating the traveling direction of the mobile body in addition to a first control input value (for example, a speed indication value) provided in each periodically repeated control cycle.

The control input calculation unit 10 calculates a second control input value that will be the first control input value of the next control cycle. To be more specific, the control input calculation unit 10 calculates the route cost through simulation of at least one predictive control input value predicted to be provided to the robot control unit after the first control input, the simulation being performed by taking into account the stochastic noise, to thereby calculate a second control input value that results in a smaller route cost. In the present disclosure, a sequence configured by input values (a control input sequence) includes as case in which there is at least one input value present in the sequence as an element that configures the sequence.

Figure 2:
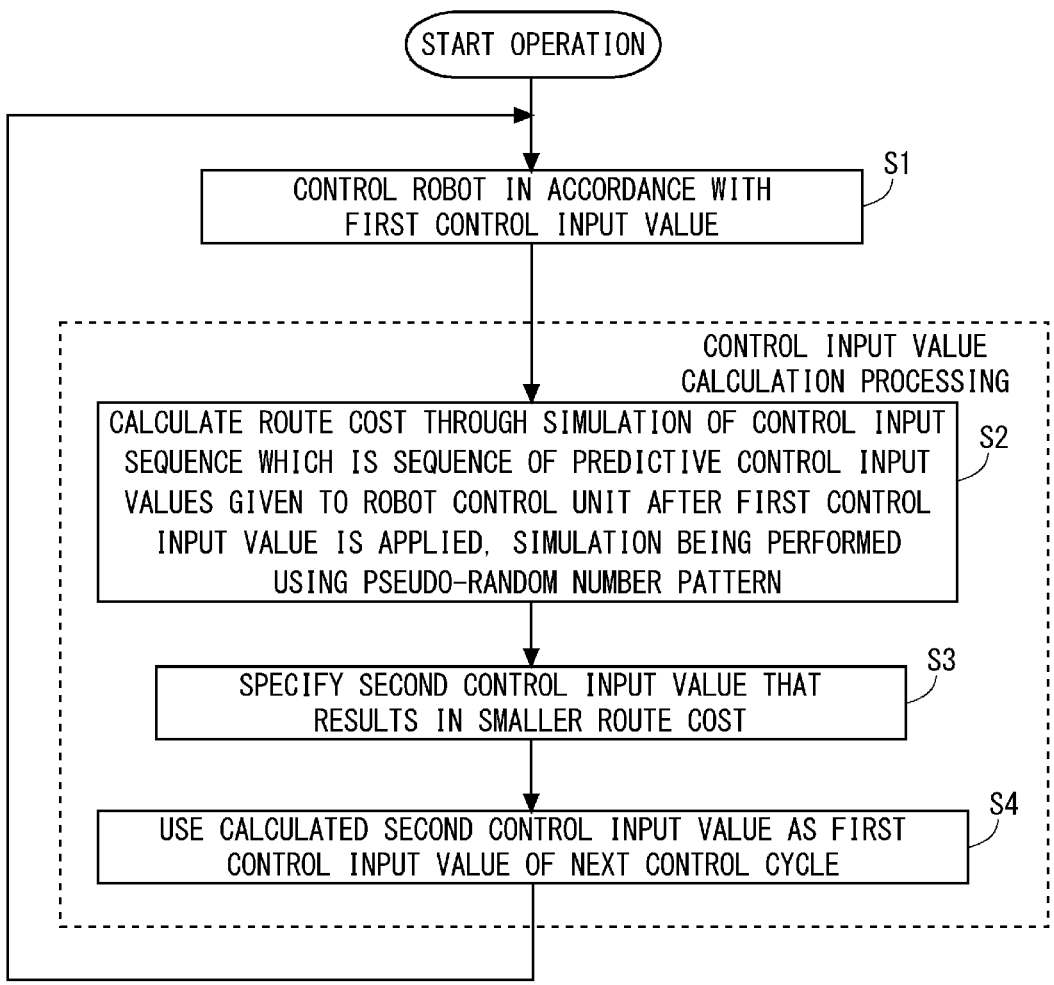
FIG. 2 is a flowchart describing operations of the control input apparatus according to the first example embodiment.

The operation of the mobile body control apparatus 1 according to the first example embodiment will now be described. FIG. 2 shows a flowchart describing operations of the control input apparatus 1 according to the first example embodiment. The mobile body control apparatus 1 according to the first example embodiment updates the first control input value to be provided to the robot control unit that controls the mobile body by periodically repeating the control cycle. Then, as the first control input value to be provided to the mobile body, the mobile body control apparatus 1 according to the first example embodiment provides, at the start of operation, the first control input value having an initial value determined in advance. Further, in the second control cycle, the mobile body control apparatus 1 according to the first example embodiment provides the first control input value calculated by the control input calculation unit 10 to the robot control unit 11. That is, in the mobile body control apparatus 1, the robot control unit 11 controls the mobile body in accordance with the first control input value (Step S1).

Next, in the mobile body control apparatus 1 according to the first example embodiment, the control input calculation unit 10 calculates a second control input value that will be the first control input value of the next control cycle. Specifically, the control input calculation unit 10 calculates the route cost through simulation of at least one predictive control input value predicted to be provided to the robot control unit after the first control input value, the simulation being performed by taking into account the stochastic noise, to thereby calculate a second control input value that results in a smaller route cost.

In FIG. 2, operations including an example of simulation performed by taking into account the stochastic noise in the operation of the control input calculation unit 10 are shown. In the example shown in FIG. 2, the control input calculation unit 10 calculates the route cost through simulation of a control input sequence which is a sequence of predictive control input values provided to the robot control unit 11 after the first control input value is applied, the simulation being performed using pseudo-random number pattern (Step S2). Further, the control input calculation unit 10 calculates, from the route cost calculated in Step S2, a second control input value that results in a smaller route cost (Step S3). The control input calculation unit 10 then uses the second control input value calculated in Step S3 as the first control input value of the next control cycle (Step S4).

Next, a result of verification of the movement trajectory and the speed trajectory of the mobile body whose speed is controlled using the mobile body control apparatus 1 according to the first example embodiment will be explained. Note that in the following description, in a space of a distance of 10 m, a wall having a width of 0.04 m and a length of 1 m is disposed between a distance of 4.5 m to 5.5 m within the space and the mobile body is made to move through the gap formed in the wall to the position 10 m ahead. Further, in the simulation described below, the size of the robot is ignored and only whether or not the center of the mobile body can pass through the gap is taken into account. Further, in the simulation described below, it is assumed that the greater the speed at which the mobile body moves, the larger the traveling error becomes. Note that in the simulation described below, five trials are repeated.

Figure 3:
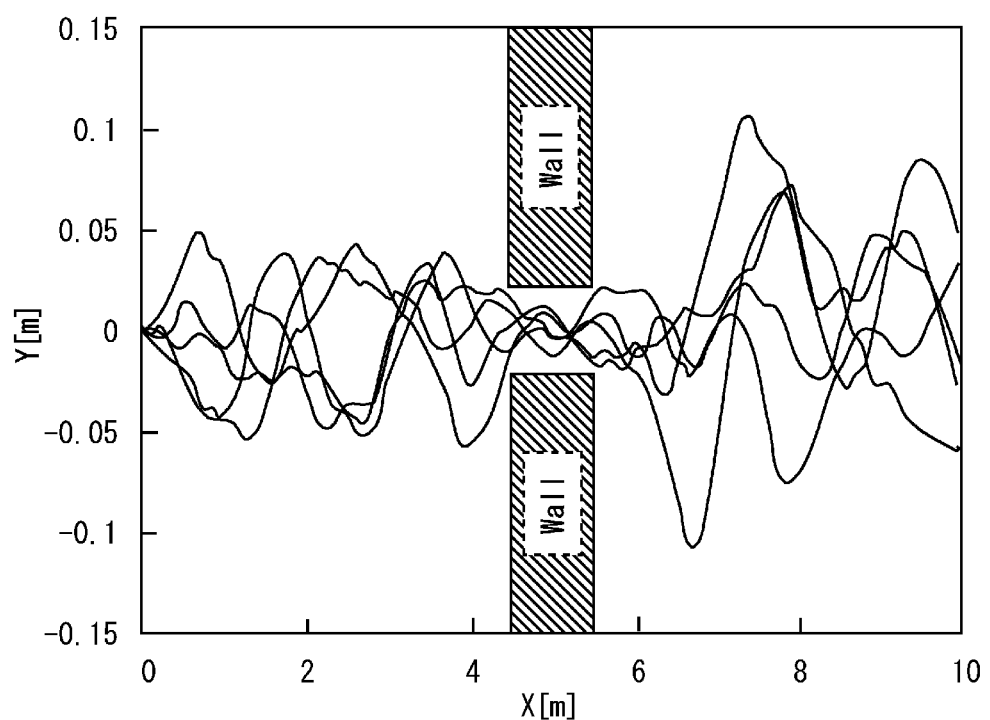
FIG. 3 shows a simulation result of a traveling route of a mobile body that uses the control input apparatus according to the first example embodiment.

FIG. 3 shows a simulation result of a traveling route of a mobile body that uses the control input apparatus according to the first example embodiment. As shown in FIG. 3, it is understood that by using the mobile body control apparatus 1 according to the first example embodiment, the mobile body passes through the gap formed in the wall and advances 10 m in all of the five trials. Further, as shown in FIG. 3, the mobile body swerves far off the route except when it passes though the gap formed in the wall.

Figure 4:
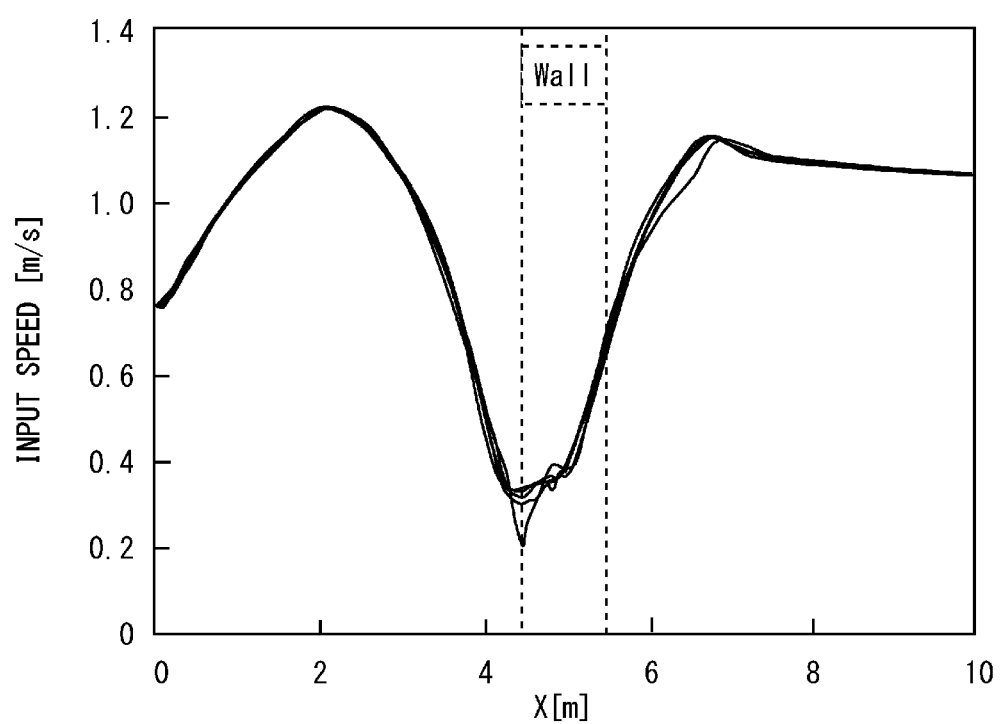
FIG. 4 shows a simulation result of a change in a traveling speed of the mobile body that uses the control input apparatus according to the first example embodiment.

Further, FIG. 4 shows a simulation result of a change in a traveling speed of the mobile body that uses the control input apparatus according to the first example embodiment. As shown in FIG. 4, it is understood that by using the mobile body control apparatus 1 according to the first example embodiment, the mobile body slows down significantly before it passes through the gap formed in the wall, which requires high traveling route accuracy. This means that the state in which the mobile body bumps into the wall is the state in which the route cost is large, and by having the control input calculation unit 10 update the first input control value to a value that results in the route cost reduction, the speed of the mobile body can be suppressed as shown in FIG. 4.

As described above, in the mobile body control apparatus 1 according to the first example embodiment, calculates the route cost based on the result of simulation performed by applying the pseudo random number pattern to the control input sequence which is a sequence of predictive values for the period ahead in time of the first control input sequence. By this configuration, in the mobile body control apparatus 1 according to the first example embodiment, even in the state in which the actual mobile body does not move in accordance with the control input value and can only move in accordance with the value in which the stochastic error is added, it is possible to perform control in which both high speed and safety are guaranteed.

Second Example Embodiment

Figure 5:
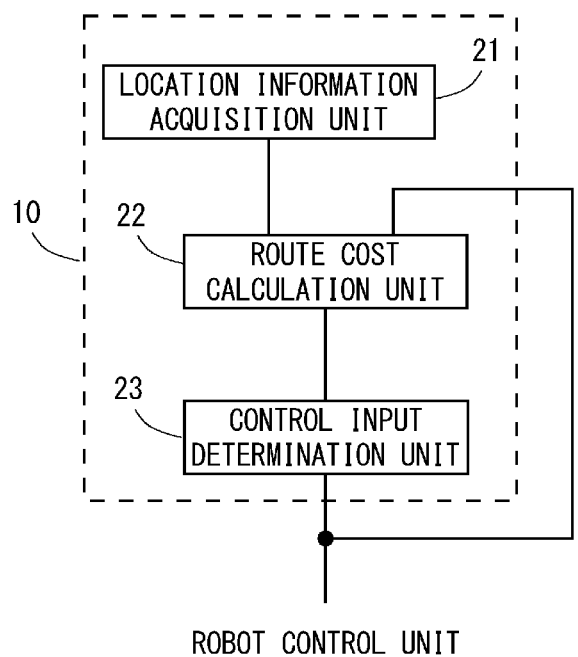
FIG. 5 is a block diagram of a control input calculation unit according to a second example embodiment.

In a second example embodiment, an example of a detailed configuration of the control input calculation unit 10 will be described. FIG. 5 is a block diagram of a control input calculation unit according to a second example embodiment. As shown in FIG. 5, the control input calculation unit 10 includes a location information acquisition unit 21, a route cost calculation unit 22, and a control input determination unit 23.

Note that in the second example embodiment, as the predictive control input value handled by the control input calculation unit 10, control input sequence including the predictive values of the control input values at a plurality of different timings is handled. Further, in the second example embodiment, an example in which the predictive control input value includes a plurality of control input sequences each indicating a different temporal variation will be described. This is a more preferable example, and the control input calculation unit 10 may operate as long as there is at least one predictive control input value.

The location information acquisition unit 21 acquires the location information indicating the location of the mobile body that is in operation. The location information acquisition unit 21 acquires information specifying the specific location of the mobile body using a camera or an equipment such as a sensor that uses a radio signal.

The control input determination unit 23 calculates the second control input value that results in the route cost reduction. Note that in the control input calculation unit 10, the route cost calculation unit 22 generates the predictive control input value and calculates the route cost corresponding to the predictive control input value. More specifically, the route cost calculation unit 22 calculates route costs for a plurality of routes (for example, N, where N is a number of control input sequence to be described below). Then, the control input determination unit 23 selects K number (K is an integer) of the control input sequence that results in route cost reduction for a plurality of routes in the ascending order from the smaller one, and an average value of the weighted values that are weighted in the order from the smallest value is calculated, and the control input value at the top of the control input sequence in which the control input values are averaged is calculated. The control input determination unit 23 determines the calculated control input value as the second control input value. Further, the control input determination unit 23 outputs, to the robot control unit 11, the determined second control input value as the first control input value of next control cycle.

Figure 6:
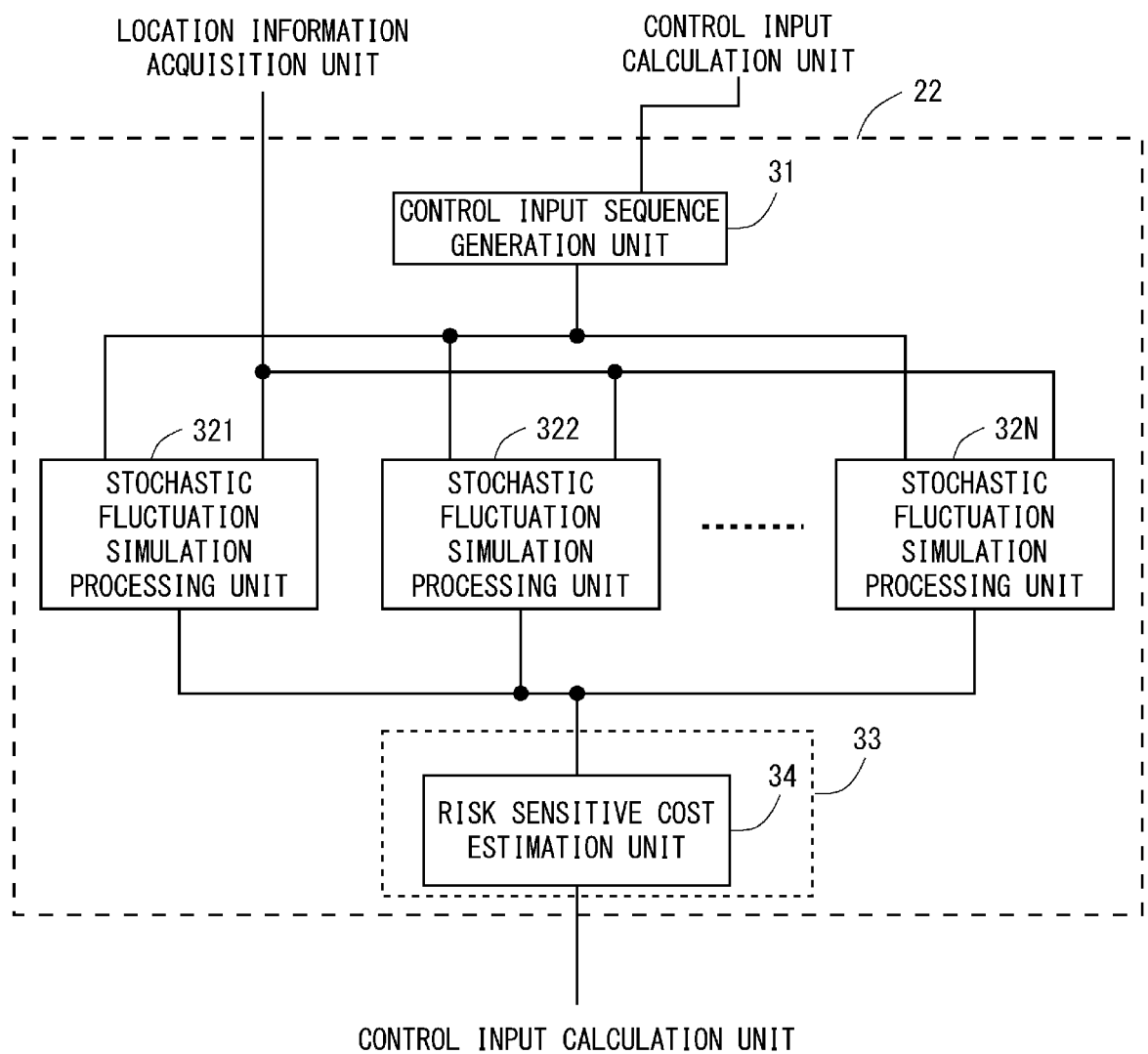
FIG. 6 is a block diagram of a route cost calculation unit according to the second example embodiment.

Next, details of the route cost calculation unit 22 will be described. FIG. 6 shows a block diagram of the route cost calculation unit 22 according to the second example embodiment. As shown in FIG. 6, the route cost calculation unit 22 includes a control input sequence generation unit 31, stochastic fluctuation simulation processing units 321 to 32N (N is an integer indicating the number of the stochastic fluctuation simulation processing unit), and a cost estimation unit 33.

The control input sequence generation unit 31 generates the predictive control input value based on the first control input value of the current control cycle. To be more specific, the control input sequence generation unit 31 generates a control input sequence (hereinafter referred to as a base control input sequence) in which the control input value set for the next timing after the control input value adopted as the first control input sequence is at the top of the control input sequence in the first control input value of the current control cycle. Further, the control input sequence generation unit 31 generates at least one control input sequence that differs from the base control input sequence in the change in speed taking into account the variations in the base control input sequence. That is, the control input sequence generation unit 31 generates a plurality of control input sequences (for example, N number of control input sequences) including the predictive control input values.

Each of the stochastic fluctuation simulation processing units 321 to 32N performs stochastic fluctuation simulation of respective predictive control input values (for example, one of the plurality of control input sequences) a plurality of times (for example, M times) using pseudo-random number patterns, the pseudo-random number patterns being different from one another. Then, the stochastic fluctuation simulation processing units 321 to 32N calculate the predicted costs as indices for determining the traveling state of the mobile body, respectively. That is, the stochastic fluctuation simulation processing units 321 to 32N calculate M number of predicted costs, respectively. Here, considering the stochastic fluctuation simulation processing units 321 to 32N, the control input calculation unit 10 calculates N×M number of predicted costs. Here, in the present disclosure, the predicted costs are indices for determining whether or not the traveling state of the mobile body is satisfactory or poor. To be more specific, the predicted costs can be regarded as the costs involved when the mobile body travels outside the target route or when the mobile body travels at a speed below a predetermined speed.

The cost estimation unit 33 includes a risk sensitive cost estimation unit 34 in the second example embodiment. The risk sensitive cost estimation unit 34 calculates a route cost J using Expression (1). Note that Expression (1) is also referred to as a risk sensitive evaluation function.

[Expression 1]

$$J = \frac{1}{\beta} \log\{E[\exp(\beta S)]\} \quad (1)$$

wherein in Expression (1), $\beta$ denotes a parameter determined by the mobile body control apparatus 1 in advance, E denotes an expected value, and S denotes cost generated in the stochastic fluctuation simulation processing unit. The risk sensitive cost estimation unit 34 calculates the route cost J for each of the plurality of control input sequences.

Next, the stochastic fluctuation simulation processing units 321 to 32N will be described in detail. The stochastic fluctuation simulation processing units 321 to 32N have the same configuration except for the control input sequence that is target to be processed and therefore the stochastic fluctuation simulation processing units 321 will be described herein.

Figure 7:
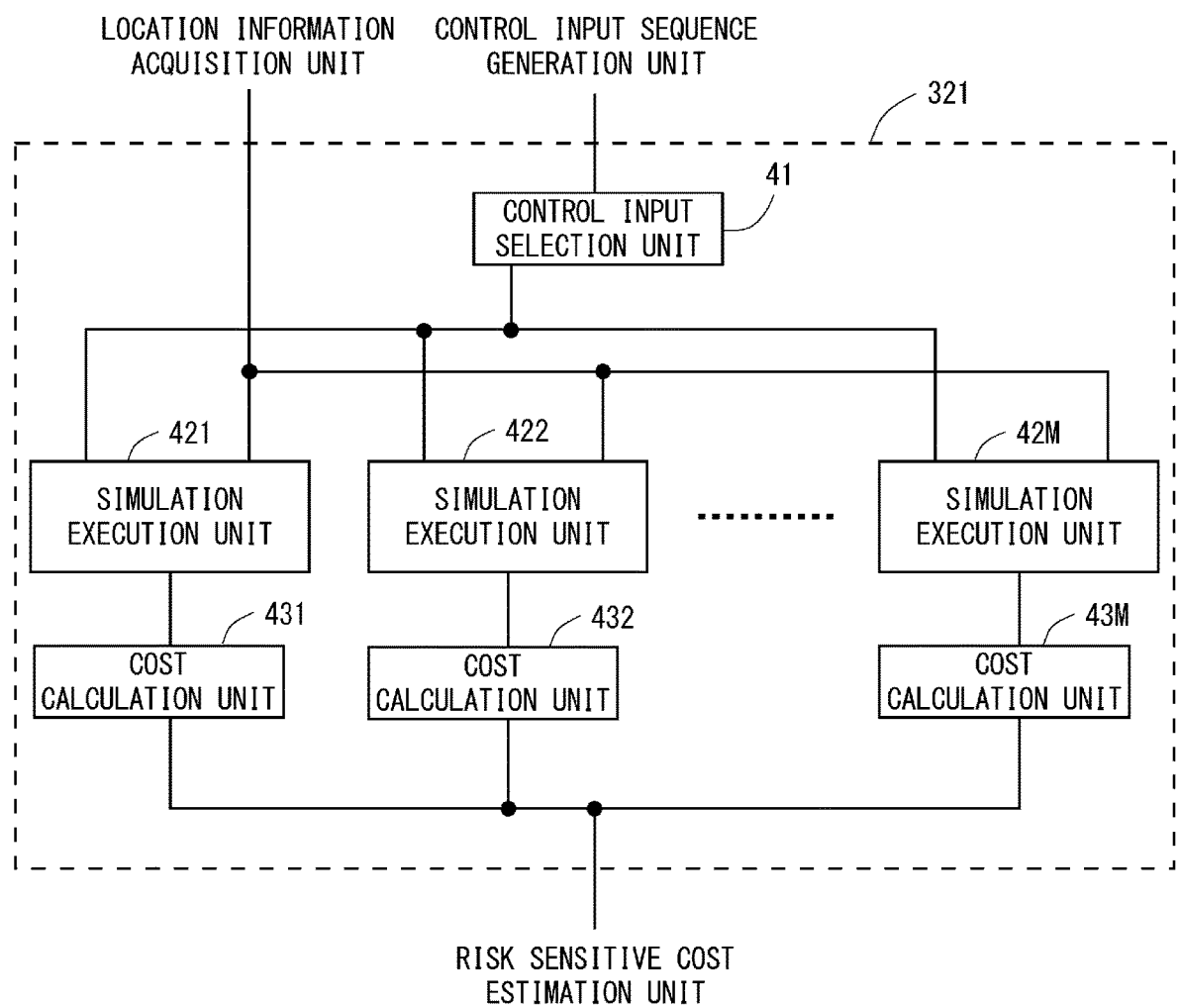
FIG. 7 is a block diagram of a stochastic fluctuation simulation processing unit according to the second example embodiment.

FIG. 7 is a block diagram showing a stochastic fluctuation simulation processing unit according to the second example embodiment. As shown in FIG. 7, the stochastic fluctuation simulation processing unit 321 includes a control input selection unit 41, simulation execution units 421 to 42M (M is an integer indicating or the number of simulation execution units or the number of pseudo-random number patterns to be applied), and cost calculation unit 431 to 43M.

The control input selection unit 41 selects one control input sequence among the plurality of control input sequences generated by the control input sequence generation unit 31. Note that in the control input calculation unit 10, the control input sequence to be selected by the control input selection unit 41 is determined in advance, and the each of the stochastic fluctuation simulation processing units 321 to 32N corresponds to the respective one of the plurality of control input sequences.

The simulation execution units 421 to 42M each performs simulation of the change trajectory of the control input value (for example, the speed of the mobile body) to be provided to the mobile body by applying one of the pseudo-random patterns included in a plurality of pseudo-random patterns (for example, M number of pseudo-random patterns) for the control input sequence selected by the control input selection unit 41. This simulation uses, for example, numerical solution of stochastic differential equations. Further, in performing route simulation of the mobile body in the simulation execution units 421 to 42M, the location information output by the location information acquisition unit 21 is used. While it is possible to use the logical location information recognized in the simulated data without using the actual location information, the simulation accuracy can be enhanced when the actual location information acquired by the location information acquisition unit 21 is used.

The cost calculation units 431 to 43M calculate the predicted costs for the simulation results calculated by the corresponding one of the plurality of simulation execution units. The M number of predicted costs generated by the cost calculation units 431 to 43M are provided to the risk sensitive cost estimation unit 34. Then, the risk sensitive cost estimation unit 34 calculates the route cost J using M number of prediction costs (the cost S in Expression (1)).

Figure 8:
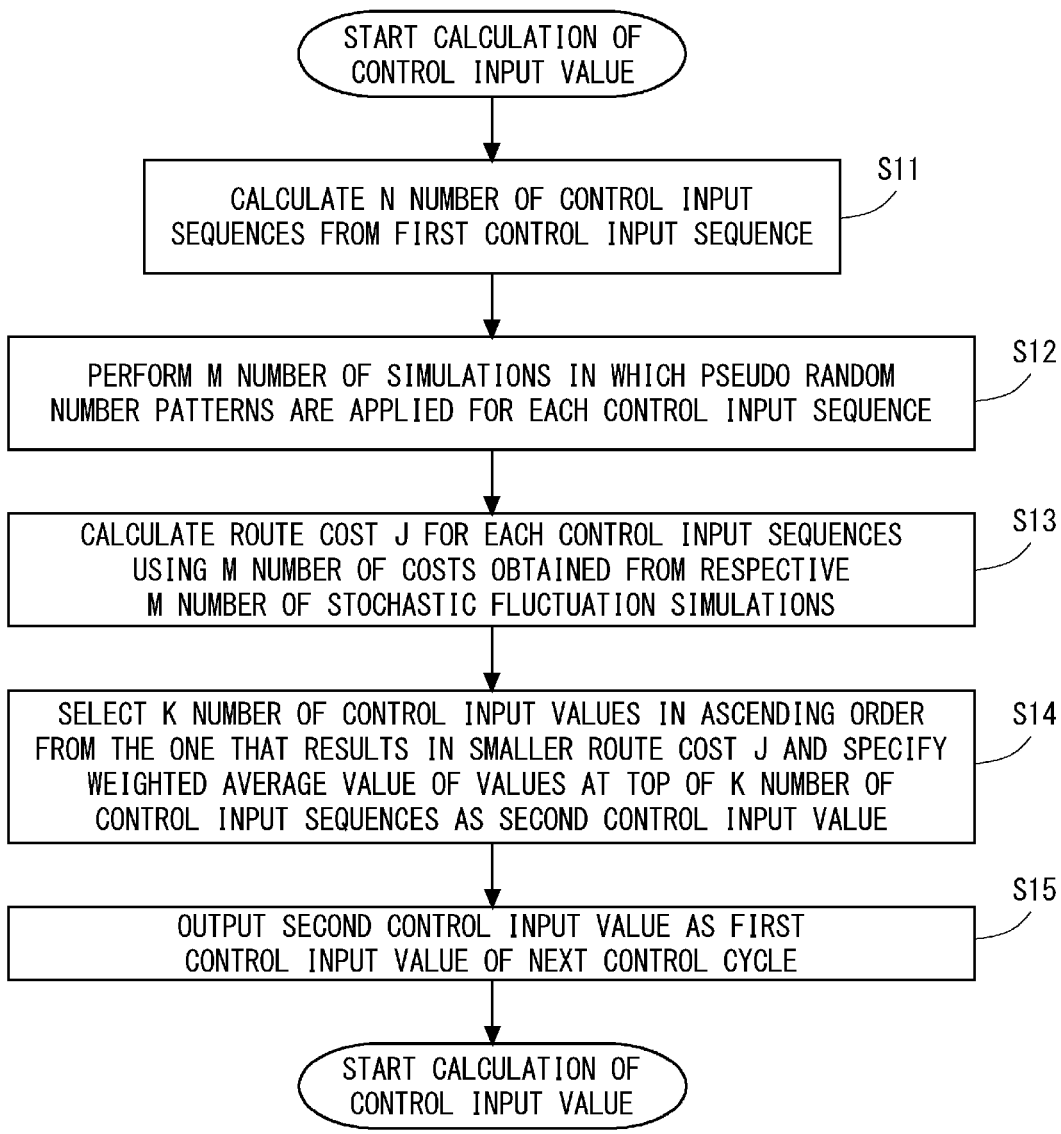
FIG. 8 is a flowchart describing operations of the control input calculation unit according to the second example embodiment.

Next, the operation of the control input calculation unit 10 will be described. FIG. 8 shows a flowchart describing operations of the control input calculation unit 10 according to the second example embodiment. As shown in FIG. 8, upon start of calculation of the control input value, the control input calculation unit 10 first calculates, using the control input sequence generation unit 31, N number of control input sequences from the control input sequences to which the first control input values of the current control cycle belong (Step S11). Note that in Step S11 which is a timing of start of the operation, there is no control input sequences determined at a timing before the timing of Step S11 and therefore N number of control input sequences that satisfy the maximum acceleration and the maximum speed are randomly determined.

Then, the control input calculation unit 10 performs N number×M number of simulations in which M number of pseudo random number patterns are applied to the N number of control input sequences using the respective stochastic fluctuation simulation processing units 321 to 32N (Step S12). Next, the control input calculation unit 10 calculates the route cost J for each of N number of control input sequences using M number of predicted costs S output from the respective stochastic fluctuation simulation processing units 321 to 32N (Step S13). That is, N number of route costs J are calculated in Step S13. Then, using the control input determination unit 23, the control input calculation unit 10 selects K number of control input sequences in the ascending order from the one that results in a smaller route cost J, generates the average control input sequence that is a weighted average value of the K number of control input sequences, and specifies the control input value at the top of the average control input sequence as the second control input value (Step S14). Then, the control input calculation unit 10 outputs the second control input value specified in Step S14 as the first control input value of the next control cycle (Step S15).

Figure 9:
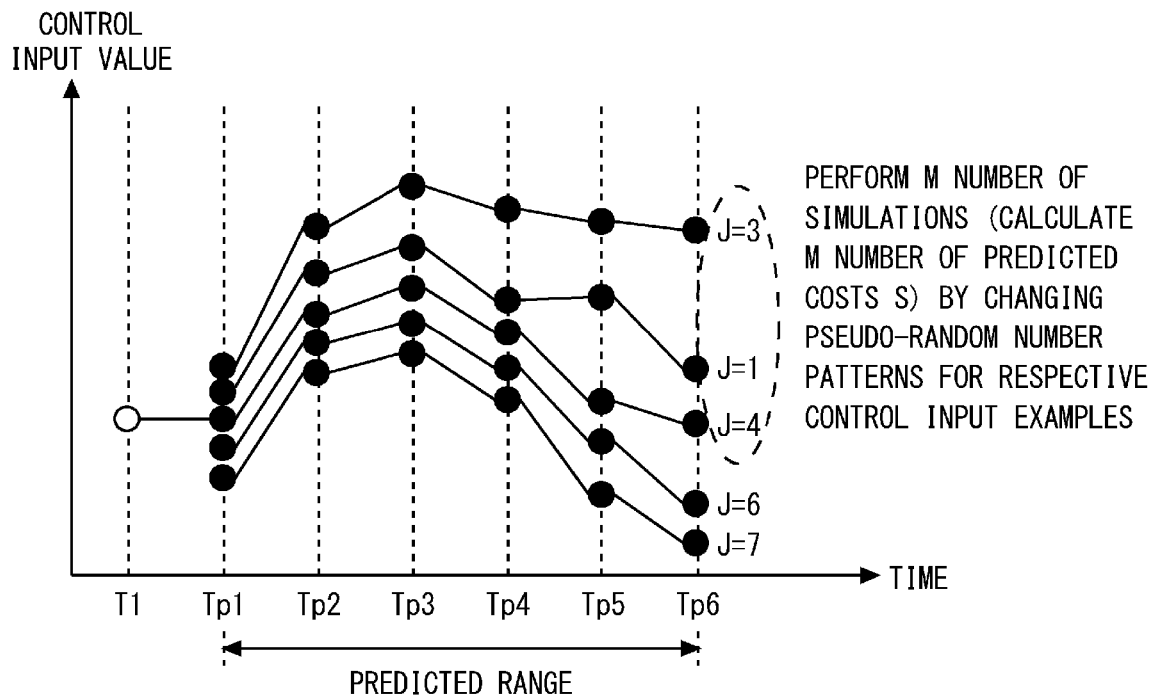
FIG. 9 is a diagram showing an example of a control input sequence to be used in the control input calculation unit according to the second example embodiment.
Figure 9:
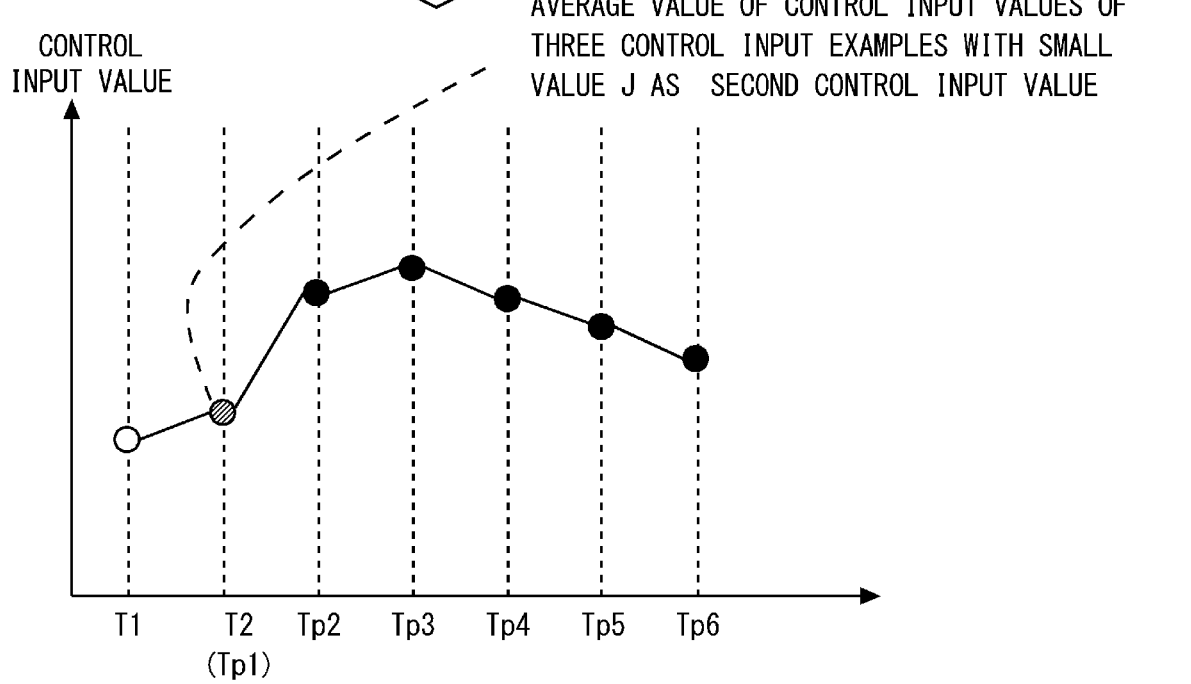
Figure 10:
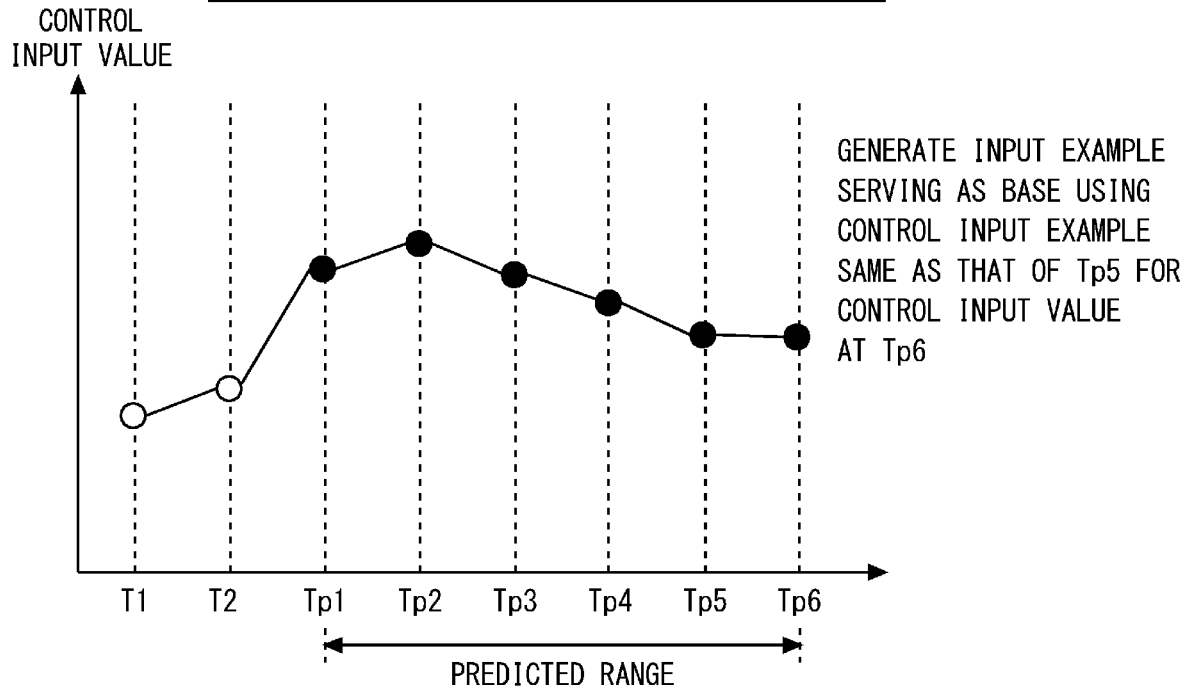
FIG. 10 is a diagram showing an example a control input sequence to be used in the control input calculation unit according to the second example embodiment.
Figure 10:
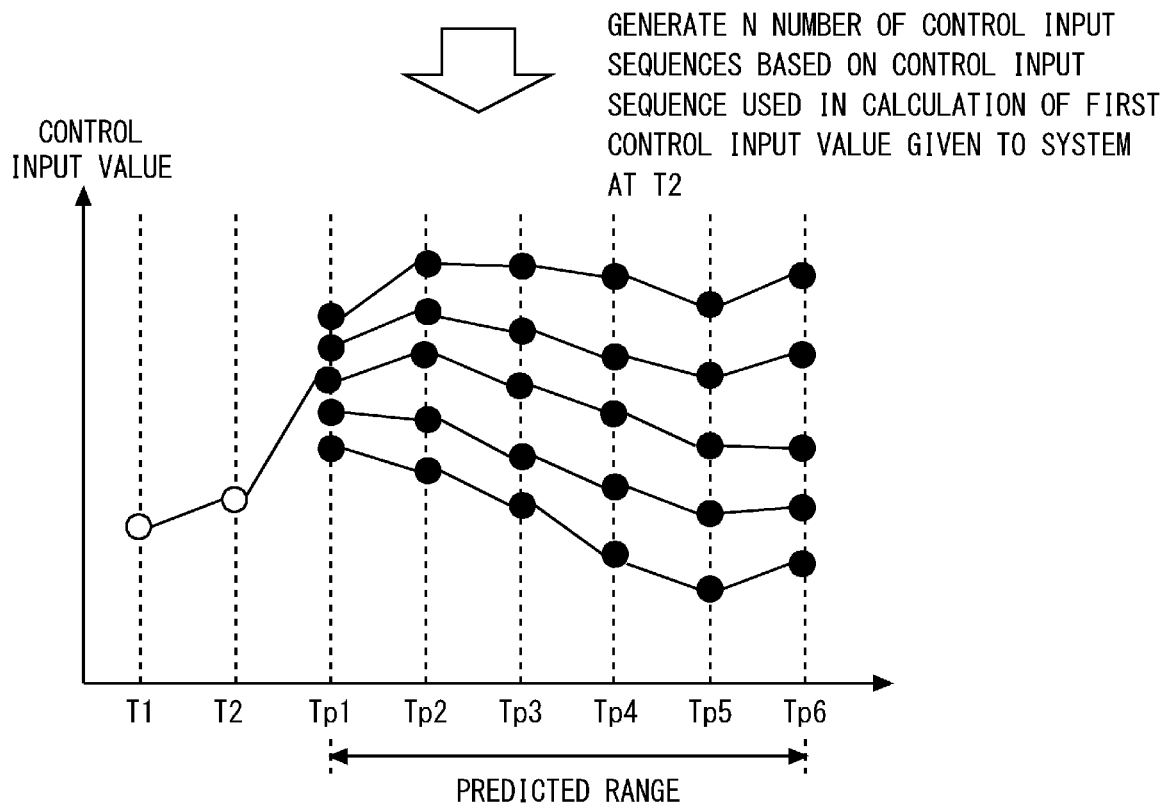

The aforementioned processing will be described from another perspective. Here, an example of the control input sequence to be used in the control input calculation unit 10 according to the second example embodiment is shown in FIGS. 9 and 10. FIG. 9 describes a case in which the second control input value is determined from the control input sequence, and FIG. 10 describes a case in which the control input sequence to be used in the next control cycle is generated. In the example shown in FIG. 9, the number N in the control input sequence is 5, the number M in the pseudo random pattern applied in the simulation is 3, and the number K in the control input sequence used in determining the second control input value is 3.

In the example of FIG. 9, the control input sequence to which the first control input value of the current control cycle T1 belongs (for example, the control input sequence in which the route cost J will be 4 in the calculation performed later) is the base control input sequence, and four control input sequences are applied to this base control input sequence. The control input sequence is obtained by listing the predictive control input values obtained by predicting the changes in the control input values (or the change in speed of the mobile body) to be provided to the mobile body for the prediction period of the control cycles Tp1 to Tp6 after the current control cycle T1.

The control input calculation unit 10 performs simulation of providing M number of pseudo random patterns to N number of control input sequences, respectively, and calculates N number of route costs J. In the example shown in FIG. 9, the routes costs J are 1, 3, 4, 6 and 7. Note that in FIG. 9, the route cost J is an integer, however, it may include numbers with decimal places. Then, the control input calculation unit 10 determines the control input value at the top of the average control input sequence generated from the weighted average value of three control input sequences that result in a smaller route cost J in the ascending order as the second control input value.

Further, the control input sequence to be used in the calculation of the first control input value of the next control cycle at the timing T2 will be described with reference to FIG. 10. As shown in FIG. 10, in the control input sequence generation unit 31, the control input value at the top of the average control input sequence shown in FIG. 9 is deleted, and a new base control input sequence in which the predictive control input value of a control cycle which is one control cycle ahead of the last control cycle is added is generated. In the example shown in FIG. 10, for the last predicted control input value of the base control input sequence, the predicted control input value that is the last but one predicted control input value is used. Then, the control input sequence generation unit 31 generates four control input sequences indicating different speed changes with respect to the base control input sequence indicated in the upper part of FIG. 10.

From the aforementioned description, in the control input calculation unit 10 according to the first example embodiment, a control input value that minimizes the risk-sensitive evaluation function can be calculated without having to perform complicated mathematical operations. By this configuration, in the mobile body control apparatus 1 that uses the control input calculation unit 10 according to the first example embodiment, even in the state in which the actual mobile body does not move in accordance with the control input value and can only move in accordance with the value in which the stochastic error is added, it is possible to perform control in which both high speed and safety are guaranteed.

Third Example Embodiment

In a third example embodiment, a route cost calculation unit 22a according to an embodiment different from the route cost calculation unit 22 will be described. Note that in the description of the third example embodiment, structural elements that are the same as those described in the second example embodiment will be denoted by the same reference symbols denoted in the second example embodiment.

Figure 11:
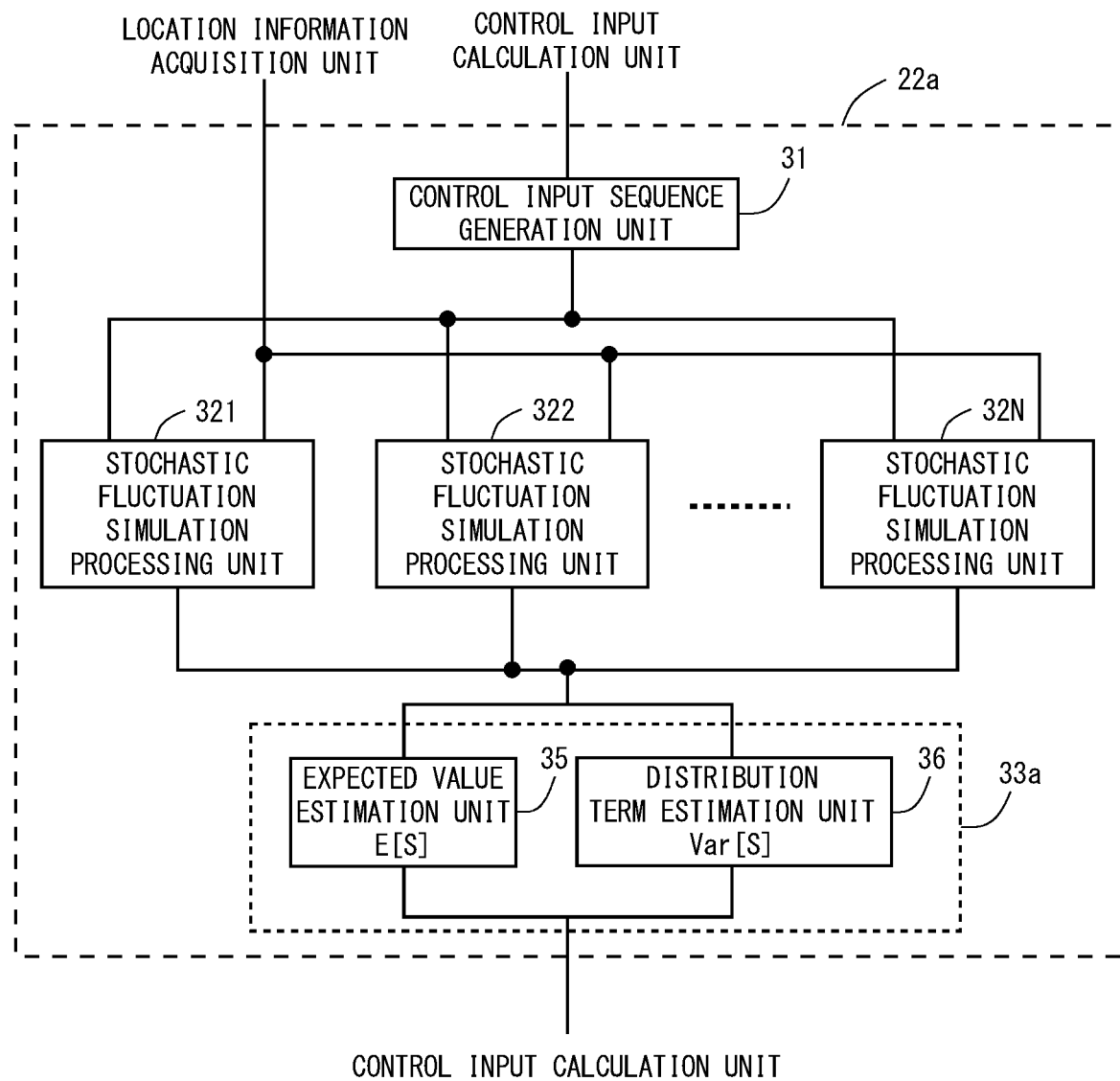
FIG. 11 is a block diagram of a route cost calculation unit according to a third example embodiment.

FIG. 11 shows a block diagram of the route cost calculation unit 22a according to the third example embodiment. As shown in FIG. 11, in the route cost calculation unit 22a, the cost estimation unit 33 of the route cost calculation unit 22 is replaced by a cost estimation unit 33a. The cost estimation unit 33a includes an expected value estimation unit 35 and a distribution term estimation unit 36.

In the second example embodiment, the evaluation function expressed by Formula (1) is used in the calculation of the route cost J performed by the risk sensitive cost estimation unit 34. However, in the case where the route cost J is calculated from Expression (1), if the stochastic variation is equal to or larger a certain degree, it may diverge and the control input value may not be stable. Therefore, in the third example embodiment, Taylor expansion of the Expression (1) is applied in the calculation of the route cost J, and by ignoring the terms after the third-order term, the influence of divergence in the predicted cost S is reflected to the route cost while reducing the possibility of divergence. First-order term and the second-order term in the expression is calculated from Expression (2).

[Expression 2]

$$J \approx E[S] + \frac{\beta}{2}\text{Var}[S] \qquad (2)$$

Here, in Expression (2), the first term is a term denoting an expected value and the second term is a term denoting distribution.

The expected value estimation unit 35 calculates the expected value for each control input sequence by applying a plurality of predicted costs obtained from the respective stochastic fluctuation simulation processing units 321 to 32N to the terms for the expected values obtained by performing Taylor expansion of the risk sensitive evaluation function. That is, the expected value estimation unit 35 calculates the first term of the Expression (2).

The distribution term estimation unit 36 calculates the distribution value for each control input sequence by applying the plurality of predicted costs obtained from the respective stochastic fluctuation simulation processing units to the terms for the distribution values obtained by performing Taylor expansion of the risk sensitive evaluation function. That is, the distribution term estimation unit 36 calculates the value for the second term of Expression (2).

Then, the cost estimation unit 33a calculates the result of addition of the expected value calculated by the expected value estimation unit 35 and the distribution value calculated by the distribution term estimation unit 36 as a route cost.

As described above, by using the cost estimation unit 33a according to the third example embodiment, divergence in the calculation of the route cost J can be suppressed effectively.

Other Example Embodiments

Figure 12:
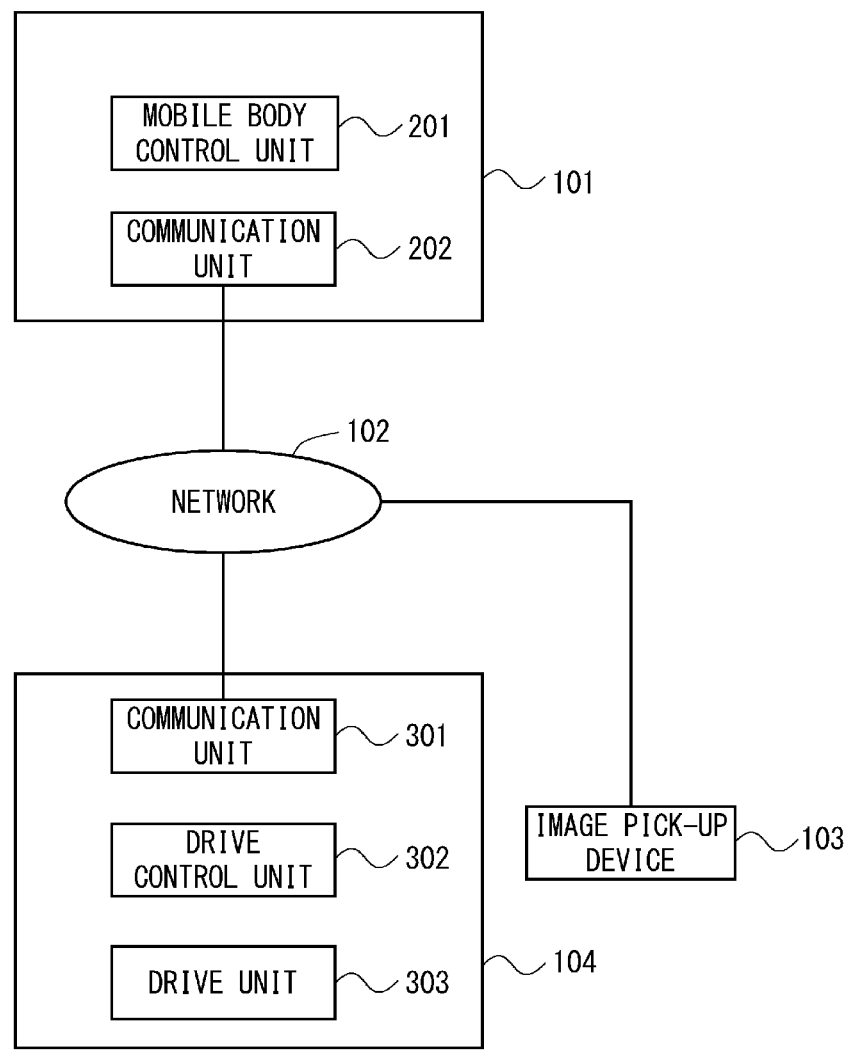
FIG. 12 is a block diagram of a mobile body control system according to another example embodiment.

In other example embodiments, the whole configuration of the mobile body control system including the mobile body control apparatus 1 and the hardware resource for realizing the mobile body control apparatus 1 will be described. FIG. 12 is a block diagram of a mobile body control system according to another example embodiment. Note that the mobile body control system shown in FIG. 12 is a schematic block diagram of the system.

The mobile body control system shown in FIG. 12 includes a remote control apparatus 101, a network 102, an image pick-up device 103, and a mobile body 104. The remote control apparatus 101 includes a mobile body control unit 201 and a communication unit 202. The mobile body control unit 201 includes the mobile body control apparatus 1 described above. Further, the communication unit 202 is an interface for the mobile body control unit 201 to perform communication with the mobile body 104 and the image pick-up device 103.

The network 102 is configured to enable mutual communication among the remote control apparatus 101, the image pick-up device 103, and the mobile body 104. The image pick-up device 103 is, for example, a camera and is utilized by the location information acquisition unit 21 inside the remote control apparatus 101.

The mobile body 104 is the target to be controlled. The mobile body 104 includes a communication unit 301, a drive control unit 302, and a drive unit 303. The communication unit 301 in an interface for the mobile body 104 to perform communication with the remote control apparatus 101. The drive control unit 302 gives an instruction to operate to the drive unit 303 based on the first control input value provided from the remote control apparatus 101. The drive unit 303 is configured of a motor and the like for driving the driving wheels.

Figure 13:
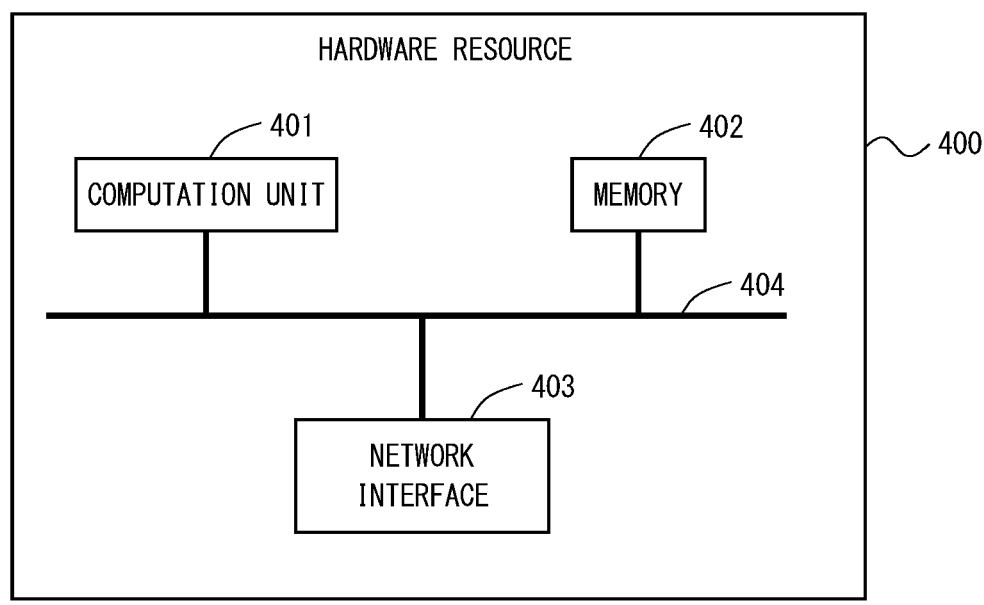
FIG. 13 is a block diagram of hardware resource used in a mobile body control system according to another example embodiment.

Next, the hardware resource configuring the remote control apparatus 101 will be described with reference to FIG. 13. FIG. 13 shows an example of the hardware resource, and other configuration such as an input interface or the like may be included in the hardware resource. That is, the hardware resource 400 shown in FIG. 13 is not to be limited to the configuration shown in FIG. 13.

The hardware resource 400 can be configured of an information processing device and a computer. In the example shown in FIG. 13, the hardware resource 400 includes a computation unit 401, a memory 402, and a network interface 403, and like that are mutually connected through an internal bus 404.

The hardware configuration resources 400 may include unillustrated hardware (for example, an input-output interface). Alternatively, the number of units such as the computation unit 401 included in the apparatus is not to be limited to the number illustrated in FIG. 13, and a plurality of computation units 401 may be included in the apparatus. For the computation unit 401, a CPU (Central Processing Unit), a MPU (Micro Processor Unit), or the like can be used.

For the memory 402, for example, RAM (Random Access Memory), ROM (Read Only Memory), HDD (Hard Disk Drive), SSD (Solid State Drive), or the like can be used.

For the network interface 403, for example, LAN (Local Area Network) card, a network adaptor, a network interface card, or the like can be used.

Note that the present disclosure is not limited to the above-described example embodiments, and can be appropriately changed without departing from the gist of the present disclosure. For example, the control input calculation unit 10 and the robot control unit 11 shown in FIG. 1 may be configured as one apparatus or may configure a system including a plurality of apparatuses.

The whole or part of the example embodiments disclosed above can be described as, but not limited to, the following supplementary notes.

(Supplementary Note 1)

A mobile body control apparatus comprising:
  a robot control unit configured to control a mobile body based on a first control input value; and
  a control input calculation unit configured to calculate a second control input value that will be the first control input value of the next control cycle, wherein
  the control input calculation unit calculates a route cost through simulation of at least one predictive control input value predicted to be provided to the robot control unit after the first control input value, the simulation being performed by taking into account a stochastic noise, to thereby calculate the second control input value that results in a smaller route cost.

(Supplementary Note 2)

The mobile body control apparatus described in Supplementary Note 1, wherein the control input calculation unit comprises:
  a route cost calculation unit configured to generate the predictive control input value and calculate the route cost corresponding to the predictive control input value; and
  a control input determination unit configured to calculate the second control input value that results in route cost reduction.

(Supplementary Note 3)

The mobile body control apparatus described in Supplementary Note 2, wherein the route cost calculation unit comprises:
  a control input sequence generation unit configured to generate the predictive control input based on the first control input value of the current control cycle;
  a stochastic fluctuation simulation processing unit configured to perform, a plurality of times, a stochastic fluctuation simulation of the predictive control input value using a pseudo-random number pattern, the pseudo-random number patterns used in the respective stochastic fluctuation simulations being different from one another, and calculate a predicted cost as an index for determining a traveling state of the mobile body in the respective stochastic fluctuation simulations; and a cost estimation unit configured to calculate the route cost using a plurality of the predicted costs generated in the respective stochastic fluctuation simulations.

(Supplementary Note 4)

The mobile body control apparatus described in Supplementary Note 3, wherein the stochastic fluctuation simulation processing unit comprises:

a plurality of simulation execution units each configured to perform at least one of the stochastic fluctuation simulations performed a plurality of times; and a plurality of cost calculation units each configured to calculate the predicted cost for the simulation result calculated by a corresponding one of the plurality of simulation execution units.

(Supplementary Note 5)

The mobile body control apparatus described in Supplementary Note 4, wherein the control input calculation unit comprises a location information acquisition unit configured to acquire location information of the mobile body, and the plurality of simulation execution units are each configured to perform calculation of the predicted cost based on a location of the mobile body specified based on the location information.

(Supplementary Note 6)

The mobile body control apparatus described in any one of Supplementary Notes 1 to 5, wherein the predictive control input value is a control input sequence including predictive values of control input values at a plurality of different timings.

(Supplementary Note 7)

The mobile body control apparatus described in Supplementary Note 6, wherein the predictive control input value includes a plurality of the control input sequences each indicating a different temporal variation.

(Supplementary Note 8)

The mobile body control apparatus described in Supplementary Note 3, wherein the cost estimation unit comprises a risk sensitive cost estimation unit configured to calculate the route cost for each of the plurality of control input sequences by applying a plurality of the predicted costs obtained from the respective stochastic fluctuation simulation processing units configured to calculate the route cost based on a risk sensitive evaluation function that makes a function behave in a risk-sensitive manner.

(Supplementary Note 9)

The mobile body control apparatus described in Supplementary Note 3, wherein the cost estimation unit comprises:

an expected value estimation unit configured to calculate an expected value for each of the control input sequences by applying a plurality of the predicted costs obtained from the respective stochastic fluctuation simulation processing units to the terms for the expected values obtained by performing Taylor expansion of a risk sensitive evaluation function that makes a function behave in a risk-sensitive manner; and a distribution term estimation unit configured to calculate the distribution value for each control input sequence by applying the plurality of predicted costs obtained from the respective stochastic fluctuation simulation processing units to the terms for the distribution values obtained by performing Taylor expansion of the risk sensitive evaluation function, and the cost estimation unit is configured to calculate a result of addition of the expected value and the distribution value as the route cost.

(Supplementary Note 10)

A mobile body control method comprising:

a robot control step of controlling a mobile body based on a first control input value; and a control input calculation step of calculating a second control input value that will be the first control input value of the next control cycle, wherein in the control calculation step, a route cost is calculated through simulation of at least one predictive control input value predicted to be provided to the robot control step after the first control input value, the simulation being performed by taking into account a stochastic noise, to thereby calculate the second control input value that results in a smaller route cost.

(Supplementary Note 11)

A mobile body control system comprising:

a robot control unit configured to control a mobile body based on a first control input value; and a control input calculation unit configured to calculate a second control input value that will be the first control input value of the next control cycle, wherein the control input calculation unit calculates a route cost through simulation of at least one predictive control input value predicted to be provided to the robot control unit after the first control input value, the simulation being performed by taking into account a stochastic noise, to thereby calculate the second control input value that results in a smaller route cost.

(Supplementary Note 12)

A non-transitory computer readable medium storing a mobile body control program configured to execute:

control input calculation processing for calculating a route cost through simulation of at least one predictive control input value, which is a predictive value of a first control input value predicted to be used after the first control input value which is provided to a mobile body in a current control cycle, the simulation being performed by taking into account a stochastic noise, thereby calculating a second control input value that results in a smaller route cost; and robot control processing for controlling a mobile body based on the first control input value set in accordance with the second control value, each processing being performed through a computation operation performed by a computation unit.

(Supplementary Note 13)

A program configured to execute:

control input calculation processing for calculating a route cost through simulation of at least one predictive control input value, which is a predictive value of a first control input value predicted to be used after the first control input value which is provided to a mobile body in a current control cycle, the simulation being performed by taking into account a stochastic noise, thereby calculating a second control input value that results in a smaller route cost; and robot control processing for controlling a mobile body based on the first control input value set in accordance with the second control value,

REFERENCE SIGNS LIST

1 MOBILE BODY CONTROL APPARATUS
10 CONTROL INPUT CALCULATION UNIT
11 ROBOT CONTROL UNIT
21 LOCATION INFORMATION ACQUISITION UNIT
22 ROUTE COST CALCULATION UNIT
23 CONTROL INPUT DETERMINATION UNIT
31 CONTROL INPUT SEQUENCE GENERATION UNIT
321 STOCHASTIC FLUCTUATION SIMULATION PROCESSING UNIT
33 COST ESTIMATION UNIT
34 RISK SENSITIVE COST ESTIMATION UNIT
35 EXPECTED VALUE ESTIMATION UNIT
36 DISTRIBUTION TERM ESTIMATION UNIT
41 CONTROL INPUT SELECTION UNIT
421 SIMULATION EXECUTION UNIT
431 COST CALCULATION UNIT
101 REMOTE CONTROL APPARATUS
102 NETWORK
103 IMAGE PICK-UP DEVICE
104 MOBILE BODY
201 MOBILE BODY CONTROL UNIT
202 COMMUNICATION UNIT
301 COMMUNICATION UNIT
302 DRIVE CONTROL UNIT
303 DRIVE UNIT
400 HARDWARE RESOURCE
401 COMPUTATION UNIT
402 MEMORY
403 NETWORK INTERFACE
404 INTERNAL BUS

The invention claimed is:

1. A mobile body control apparatus comprising:
a memory storing instructions; and
a processor configured to execute the instructions to:
control a robot in a first control cycle according to a first control input value;
calculate a second control input value for controlling the robot in a second control cycle; and
control the robot in the second control cycle according to the calculated second control input value, wherein
the processor is configured to execute the instructions to calculate the second control input value by:
for each of a plurality of potential control input values, calculating a corresponding route cost of a corresponding simulated route of the robot resulting from simulated control of the robot in the second control cycle according to the potential control input value, the corresponding route cost quantifying how far away the robot is from a desired state, wherein calculation of the corresponding route cost takes into account stochastic noise; and
calculating the second control input as the potential control input value for which the calculated corresponding route cost is smallest.

2. The mobile body control apparatus according to claim 1, wherein the processor is configured to execute the instructions to further:
generate each potential control input value.

3. The mobile body control apparatus according to claim 2, wherein the processor is configured to execute the instructions to further:

generate each potential control input value based on the first control input value of the first control cycle;
perform, a plurality of times, a stochastic fluctuation simulation of each potential control input value using a pseudo-random number pattern, the pseudo-random number patterns used in the stochastic fluctuation simulation that is different for each potential control input value, and calculate a predicted cost as an index for determining a traveling state of the mobile body in the stochastic fluctuation simulation; and
calculate the corresponding route cost using the predicted cost for the stochastic fluctuation simulation for each potential control input value.

4. The mobile body control apparatus according to claim 3, wherein the processor comprises:
a plurality of first processors each configured to perform at least one of the stochastic fluctuation simulation performed a plurality of times; and
a plurality of second processors each configured to calculate the predicted cost for the simulation result calculated by a corresponding one of the plurality of first processors.

5. The mobile body control apparatus according to claim 4, wherein
the processor is configured to execute the instructions to further acquire location information of the mobile body, and
the plurality of first processors are each configured to perform calculation of the predicted cost based on a location of the mobile body specified based on the location information.

6. The mobile body control apparatus according to claim 1, wherein each potential control input value is a control input sequence including predictive values of control input values at a plurality of different timings.

7. The mobile body control apparatus according to claim 6, wherein each potential control input value includes a plurality of the control input sequences each indicating a different temporal variation.

8. A mobile body control method performed by a computer and comprising:
controlling a robot in a first control cycle according to a first control input value;
calculating a second control input value for controlling the robot in a second control cycle; and
controlling the robot in the second control cycle according to the calculated second control input value,
wherein calculating the second control input value comprises:
for each of a plurality of potential control input values, calculating a corresponding route cost of a corresponding simulated route of the robot resulting from simulated control of the robot in the second control cycle according to the potential control input value, the corresponding route cost quantifying how far away the robot is from a desired state, wherein calculation of the corresponding route cost takes into account stochastic noise; and
calculating the second control input as the potential control input value for which the calculated corresponding route cost is smallest.

9. A non-transitory computer readable medium storing a mobile body control program executable by a computer to perform processing comprising:
controlling a robot in a first control cycle according to a first control input value;

calculating a second control input value for controlling the robot in a second control cycle; and controlling the robot in the second control cycle according to the calculated second control input value, wherein calculating the second control input value comprises:

for each of a plurality of potential control input values, calculating a corresponding route cost of a corresponding simulated route of the robot resulting from simulated control of the robot in the second control cycle according to the potential control input value, the corresponding route cost quantifying how far away the robot is from a desired state, wherein calculation of the corresponding route cost takes into account stochastic noise; and calculating the second control input as the potential control input value for which the calculated corresponding route cost is smallest.

* * * * *